(12) United States Patent
Kim et al.

(10) Patent No.: US 8,077,117 B2
(45) Date of Patent: Dec. 13, 2011

(54) ELECTRONIC DISPLAY DEVICE AND METHOD THEREOF

(75) Inventors: Beom-Shik Kim, Suwon-si (KR); Hui Nam, Suwon-si (KR); Chan-Young Park, Suwon-si (KR); Ja-Seung Ku, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 967 days.

(21) Appl. No.: 12/034,554

(22) Filed: Feb. 20, 2008

(65) Prior Publication Data

US 2008/0259063 A1    Oct. 23, 2008

(30) Foreign Application Priority Data

Apr. 17, 2007    (KR) .................. 10-2007-0037477

(51) Int. Cl.
    *G09G 5/00*    (2006.01)
(52) U.S. Cl. .................. 345/7; 345/87; 345/109
(58) Field of Classification Search .......... 345/87, 345/109, 7, 8, 9
    See application file for complete search history.

(56) References Cited

U.S. PATENT DOCUMENTS

| | | | |
|---|---|---|---|
| 5,831,765 A | 11/1998 | Nakayama et al. | |
| 6,094,216 A * | 7/2000 | Taniguchi et al. | 348/51 |
| 7,068,252 B2 * | 6/2006 | Hattori et al. | 345/87 |
| 7,609,330 B2 * | 10/2009 | Kim | 349/15 |
| 7,796,332 B2 * | 9/2010 | Ochi | 359/462 |

FOREIGN PATENT DOCUMENTS

| | | |
|---|---|---|
| EP | 0 744 872 A2 | 11/1996 |
| JP | 7-75135 A | 3/1995 |
| JP | 9-171156 A | 6/1997 |
| JP | 2000-284223 A | 10/2000 |
| JP | 2000-284224 A | 10/2000 |
| KR | 1999-0085280 A | 12/1999 |
| KR | 10-0696926 B1 | 3/2007 |
| KR | 10-2007-0040544 A | 4/2007 |
| KR | 10-0719507 B1 | 5/2007 |

OTHER PUBLICATIONS

Patent Abstracts of Japan for Publication No. 07-075135, published on Mar. 17, 1995 in the name of Katagiri Masayuki et al.
Patent Abstracts of Japan for Publication No. 09-171156, published on Jun. 30, 1997 in the name of Tateno Tetsuya.
Patent Abstracts of Japan for Publication No. 2000-284223, published on Oct. 13, 2000 in the name of Yuasa Koyo et al.

(Continued)

*Primary Examiner* — Duc Dinh
(74) *Attorney, Agent, or Firm* — Christie, Parker & Hale, LLP

(57)    ABSTRACT

An electronic image device and a driving method thereof. An image of one frame is displayed in a frame period divided into at least two periods including first and second periods. A barrier layer includes a first barrier driven during the first period and a second barrier driven during the second period. The same plane image is repeatedly displayed during the first and second periods in an area for displaying the plane image on the display unit, and a first image displayed during the first period and a second image displayed during the second period are respectively images combined in different sequences in an area for displaying a stereoscopic image on the display unit.

15 Claims, 11 Drawing Sheets

OTHER PUBLICATIONS

Patent Abstracts of Japan for Publication No. 2000-284224, published on Oct. 13, 2000 in the name of Kuma Hitoshi et al.
Korean Patent Abstracts for Publication No. 1019990085280 A, published on Dec. 6, 1999 in the name of I, Sun Yeong.
Korean Patent Abstracts for Publication No. 1020040111042 A, published on Dec. 31, 2004 in the name of Hattori, Tomohiko et al. (Patented as KR 10-0696926).
Korean Patent Abstracts for Publication No. 1020070040544 A, published on Apr. 17, 2007 in the name of Chang, Jin Wook et al.
Korean Patent Abstracts for Publication No. 100719507 B1, published on May 11, 2007 in the name of Lee, Hyo Jin et al.
European Search Report for corresponding European Application No. 08154501.4 dated Aug. 4, 2008 indicating relevance of the reference cited herein.

* cited by examiner

ELECTRONIC DISPLAY DEVICE AND METHOD THEREOF

CROSS-REFERENCE TO RELATED APPLICATION

This application claims priority to and the benefit of Korean Patent Application No. 10-2007-0037477 filed in the Korean Intellectual Property Office on Apr. 17, 2007, the entire contents of which are incorporated herein by reference.

BACKGROUND OF THE INVENTION

1. Field of the Invention

The present invention relates to an electronic image device, and more particularly to an electronic image device for displaying a stereoscopic image and a plane image.

2. Description of the Related Art

In general, humans sense a stereoscopic effect based on physiological and experiential factors, and three-dimensional image displaying technologies express a stereoscopic effect of an object by using binocular parallax, which is a key factor for allowing humans to recognize a stereoscopic effect at a short distance. An electronic imaging device that displays stereoscopic images uses a method in which left and right images are spatially separated by using an optical element so that a stereoscopic image can be seen. Typical methods include a method using a lenticular lens array and a method using a parallax barrier. However, a conventional device capable of displaying a stereoscopic image and a plane image concurrently or simultaneously has a complicated configuration and operation, leading to increased manufacturing cost. Further, resolution of the stereoscopic image is considerably decreased compared to that of the plane image. Thereby, when the stereoscopic image and the plane image are simultaneously or concurrently displayed, a resolution difference between the two images is apparent, and is not desirable to a viewer.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention relates to an electronic image device with improved image quality for displaying a plane image and a stereoscopic image, and a method thereof.

An electronic image device according to an exemplary embodiment of the present invention includes a display unit and a barrier layer. The display unit displays an image in at least one frame period. The at least one frame is divided into at least two periods including a first period and a second period. The barrier layer includes a first barrier driven during the first period and a second barrier driven during the second period. The same plane image is displayed during the first and second periods in an area for displaying the plane image on the display unit, and a first image displayed during the first period and a second image displayed during the second period are respectively images combined in different sequences in an area for displaying a stereoscopic image on the display unit. The first image may include a first view image and a second view image in a first combination, and the second image may include the second view image and the first view image in a second combination. The first barrier may include a plurality of first barrier electrodes in a stripe pattern and a first connection electrode coupled to each of the plurality of first barrier electrodes and extending in a direction crossing the plurality of first barrier electrodes. The second barrier may include a plurality of second barrier electrodes in a stripe pattern that alternate with the plurality of first barrier electrodes, and a second connection electrode coupled to each of the plurality of second barrier electrodes and extending in a direction crossing the plurality of second barrier electrodes. The first and second barriers may be transmission areas while they are not driven, and the first and second barriers may be non-transmission areas while they are driven. Alternatively, the first and second barriers may be non-transmission areas while they are not driven, and the first and second barriers may be transmission areas while they are driven.

An electronic image device according to another exemplary embodiment of the present invention includes a display unit, a data driver, a controller, and a barrier layer. The display unit includes a plurality of scan lines for transmitting a plurality of selection signals, a plurality of data lines for transmitting a plurality of data signals, and a plurality of pixels coupled to the scan lines and the data lines. The data driver converts input data into the plurality of data signals and transmits the plurality of data signals to the plurality of data lines in synchronization with the selection signals. The controller reads an input signal, and when the input signal includes stereoscopic image data, display each stereoscopic image frame in at least two periods including a first period and a second period, transmits a first period stereoscopic image data corresponding to the first stereoscopic image frame to the data driver so that a first stereoscopic image is displayed during the first period, and transmits a second period stereoscopic image data corresponding to the stereoscopic image frame to the data driver so that a second stereoscopic image is displayed during the second period, and when the input signal includes plane image data, transmits the plane image data to the data driver so that a plane image is displayed during the first period, and transmits the plane image data to the data driver so that the same plane image is displayed during the second period. The barrier layer includes a first barrier driven during the first period and a second barrier driven during the second period. The first stereoscopic image may be formed by combining a first view image and a second view image in a first combination, and the second stereoscopic image may be formed by combining the second view image and the first view image in a second combination. The controller may include a frame buffer memory for storing the plane image data, the first stereoscopic image data, and the second stereoscopic image data. The first barrier may include a plurality of first barrier electrodes in a stripe pattern, and a first connection electrode coupled to each of the plurality of first barrier electrodes and extending in a direction crossing the plurality of first barrier electrodes. The second barrier may include a plurality of second barrier electrodes in a stripe pattern that alternates the plurality of first barrier electrodes, and a second connection electrode coupled to each of the plurality of second barrier electrodes and extending in a direction crossing the plurality of second barrier electrodes. The first and second barriers may be transmission areas while they are not driven, and the first and second barriers may be non-transmission areas when they are driven. Alternatively, the first and second barriers may be non-transmission areas while they are not driven, and the first and second barriers may be transmission areas when they are driven.

In a driving method of an electronic image device including a display unit for displaying an image and a barrier layer formed on the display unit, data included in an input signal are divided into plane image data and stereoscopic image data, a frame period for displaying the image of one frame is divided into at least two periods including a first period and a second period, a first stereoscopic image generated by using the stereoscopic image data is displayed on the display unit during the first period, and a second stereoscopic image generated by using the stereoscopic image data is displayed on the display unit during the second period. A plane image generated by using the plane image data is displayed during the first period and the second period, and in the barrier layer, a non-transmission area and a transmission area are generated during the first period in an alternating pattern, and the non-transmission area and the transmission area are alternated in the second period. The first stereoscopic image may be formed by combining images from a first view image and a second view image in a first combination, and the second stereoscopic image may be formed by combining the images from the second view image to the first view image in a second combination. In the displaying of the first stereoscopic image and the second stereoscopic image on the display unit, data for the first view image and data for the second view image that are included in the stereoscopic image data may be combined in a first combination to generate a first stereoscopic image data, and the data for the first view image and the data for the second view image that are included in the stereoscopic image data may be combined in a second combination to generate a second stereoscopic image data. The first stereoscopic image data may be stored according to an address of a first pixel corresponding to the first stereoscopic image data among a plurality of pixels forming the display unit, and the second stereoscopic image data may be stored according to the address of the first pixel.

DETAILED DESCRIPTION OF THE EMBODIMENTS

Figure 1:
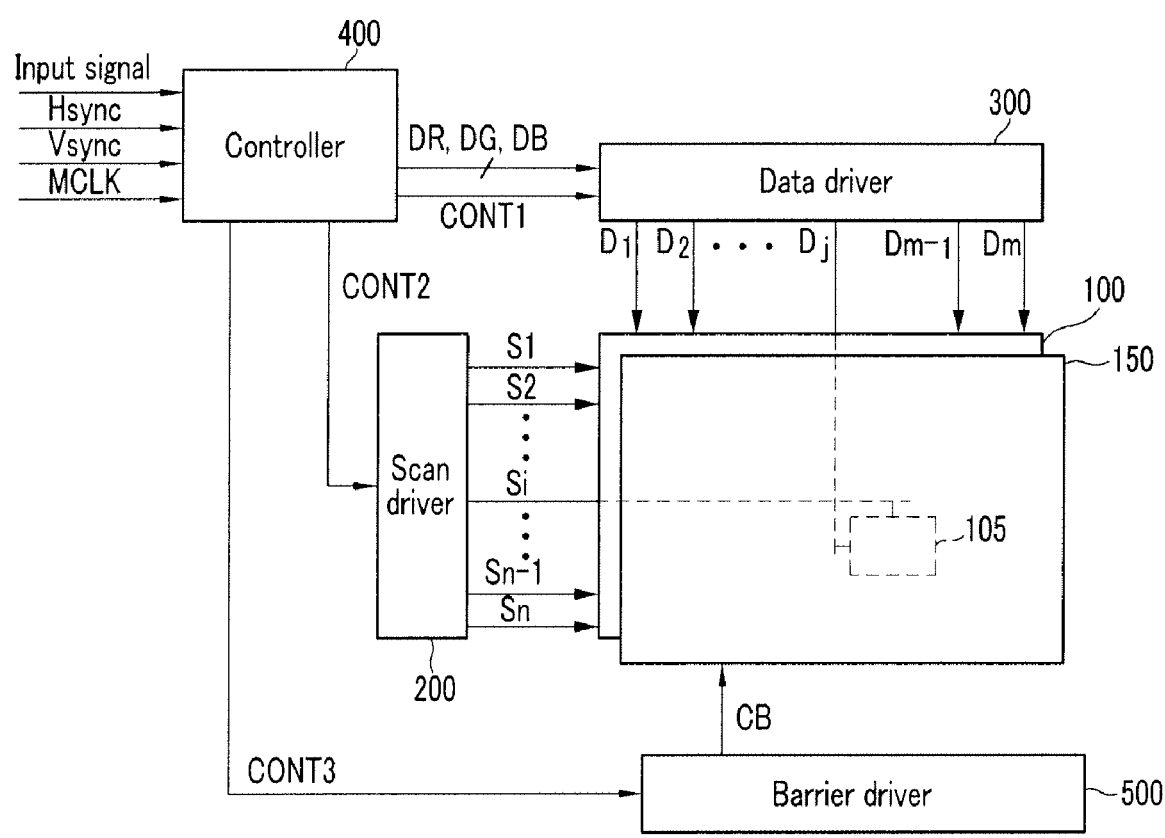
FIG. 1 shows a schematic diagram of an electronic image device according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

An electronic image device according to an exemplary embodiment of the present invention and a driving method thereof will now be described.

FIG. 1 shows a schematic diagram of an electronic image device according to a first exemplary embodiment of the present invention.

As shown in FIG. 1, the electronic image device according to the first exemplary embodiment of the present invention may selectively display a plane image and a stereoscopic image, and it includes a display unit 100, a barrier layer 150, a scan driver 200, a data driver 300, a controller 400, and a barrier driver 500.

The display unit 100 includes a plurality of scan lines S1~Sn that transfer selection signals, a plurality of data lines D1~Dm that are insulated from and cross the plurality of scan lines S1~Sn and that transfer data signals, and a plurality of pixels 105 formed on at least one crossing region among crossing regions of the scan lines and the data lines. In the present exemplary embodiment, a pixel includes a red sub-pixel that displays red (R), a green sub-pixel that displays green (G), and a blue sub-pixel that displays blue (B). Also, in the present exemplary embodiment, the plurality of pixels 105 of the display unit 100 are divided into pixels corresponding to a left-eye image (referred to as "left-eye pixels", hereinafter), and pixels corresponding to a right-eye image (referred to as "right-eye pixels", hereinafter). The left-eye pixels and the right eye-pixels may be arranged in parallel with each other to form a repeated stripe pattern or a zigzag pattern. The left-eye pixels and the right-eye pixels can be suitably changed according to different structures of the barrier layer 150. The exemplary embodiment of the present invention is not limited thereto, and a configuration of the barrier layer 150 may be determined according to the arrangement of the left-eye and right-eye pixels. Each of the pixels of the display unit 100 according to the present exemplary embodiment include a respective organic light emitting element or a respective liquid crystal layer element. In addition, the display unit 100 may be a plasma display device or a field emission display. The display unit 100 according to the first exemplary embodiment of the present invention includes organic light emitting elements and pixel circuits for driving the organic light emitting elements.

Figure 2:
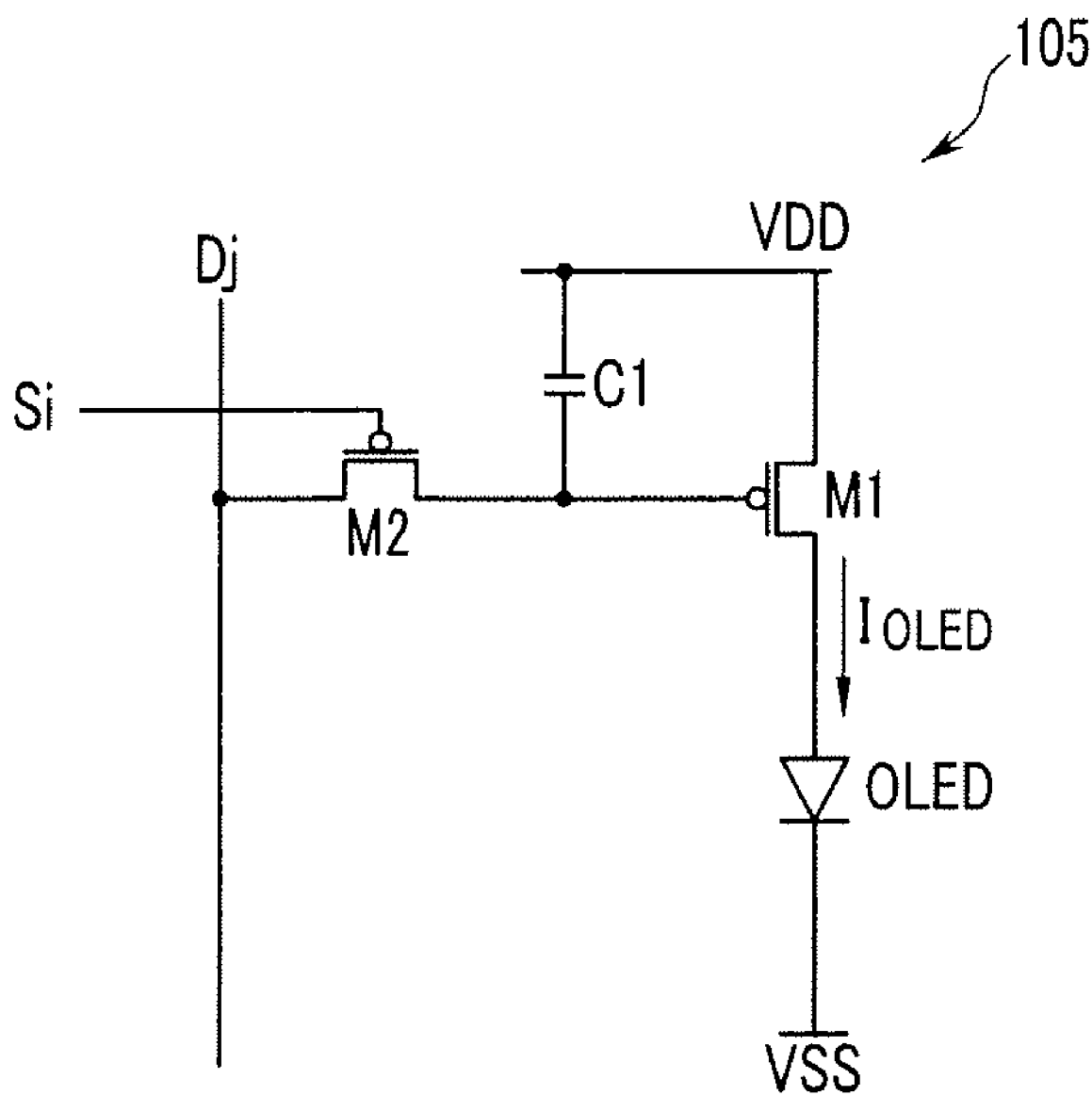
FIG. 2 is a schematic diagram of a configuration of a pixel according to the first exemplary embodiment of the present invention.

FIG. 2 is a schematic diagram of a configuration of a pixel of the plurality of pixels 105 according to the first exemplary embodiment of the present invention.

Each pixel of the plurality of pixels 105 according to the first exemplary embodiment of the present invention includes a driving transistor M1, a switching transistor M2, a capacitive element C1, and an organic light emitting element (OLED). The OLED has diode characteristics, and has a structure including an anode, an organic thin film, and a cathode electrode layer.

Each pixel circuit is positioned at a crossing of one of the plurality of scan lines $S_i$ and one of the plurality of data lines $D_j$, and is coupled to each scan line $S_i$ and each data line $D_j$. The driving transistor M1 generates a driving current $I_{OLED}$ in response to a voltage applied to between its gate electrode and its source electrode. The switching transistor M2 is turned on in response to a selection signal from the scan line $S_i$, and when the switching transistor M2 is turned on, a data signal from the data line $D_j$ is transferred to the gate electrode of the driving transistor M1. The capacitive element C1 has its ends respectively connected between the gate electrode and the source electrode of the driving transistor M1, and uniformly maintains voltages across the ends. Thereby, the driving transistor M1 generates the driving current $I_{OLED}$ corresponding to a difference between the voltage of the data signal transferred to its gate electrode and a power source voltage VDD applied to its source electrode. The generated driving current $I_{OLED}$ flows to the OLED through a drain electrode of the M1 transistor. The OLED emits light corresponding to the driving current $I_{OLED}$.

Referring back to FIG. 1, the scan driver 200 is coupled with the scan lines $S_1$ to $S_n$ of the display unit 100, and applies selection signals as a combination of a gate ON voltage and a gate OFF voltage to the scan lines $S_1$ to $S_n$. The scan driver 200 may apply the selection signals to the plurality of scan lines $S_1$ to $S_n$ such that the selection signals sequentially have the gate ON voltage. When the respective selection signal has the gate ON voltage, the switching transistor M2 of a pixel circuit (as shown in FIG. 2) coupled with a corresponding scan line is turned on.

The data driver 300 is coupled with the data lines $D_1$ to $D_m$ of the display unit 100, and applies data signals respectively representing a gray level to the data lines $D_1$ to $D_m$. The data driver 300 converts input image data DR, DG, and DB, which are input from the controller 400 and have a gray level, into data signals in the form of voltage or current.

The controller 400 receives an input signal IS, a horizontal synchronization signal Hsync, a vertical synchronization signal Vsync, and a main clock signal MCLK from outside, generates a scan control signal CONT1, a data control signal CONT2, image data signals DR, DG, and DB, and a barrier driver control signal CONT3, and transfers them respectively to the scan driver 200, the data driver 300, and the barrier driver 500. The controller 400 generates an inner clock signal by using the main clock signal MCLK to synchronize the timing for transmitting the selection signals to the scan lines and transmitting the data signals to the data lines. The scan control signal CONT1 includes a scan start signal indicating the start of scanning and a first clock signal. In the present exemplary embodiment, the scan start signal is a signal that controls a point of time at which an image of a single frame starts to be displayed on the display unit 100 in synchronization with the vertical synchronization signal indicating the start of transferring of image data of the single frame, and the first clock signal is a signal that controls a point of time at which select signals are transferred to each of the plurality of scan lines $S_1$~$S_n$ in synchronization with the horizontal synchronization signal indicating transferring of the input image data with respect to pixels of a single row. The data control signal CONT2 includes a second clock signal having a certain period in synchronization with the horizontal synchronization signal and a horizontal synchronization start signal that controls the start of the transfer of the data signal. In transferring the input image data corresponding to the pixels of a single row to the data driver 300, the controller 400 may transfer the input image data DR, DG, and DB through three channels corresponding to colors of the data or may sequentially transfer the input image data DR, DG, and DB through a single channel.

Here, the input signal IS input to the controller 400 may be one of general plane image data, 3D graphics data to be displayed in three dimensions on a planar surface by including three-dimensional spatial coordinates and surface information of an object, or stereoscopic image data including each view point image data, and when a plane image and a stereoscopic image are displayed together on the display unit 100, they may include all the plane image data and stereoscopic image data. Regardless of whether the input signal is stereoscopic image data or plane image data, the controller 400 according to the exemplary embodiment of the present invention transmits the barrier driver control signal CONT3 for controlling the barrier layer 150 to the barrier driver 500. The electronic image device according to the exemplary embodiment of the present invention drives the barrier layer 150 regardless of whether the image is a plane image or a stereoscopic image. In this case, when the plane image is displayed on the display unit 100, the same image is displayed on the left-eye and right-eye pixels. The electronic image device according to the exemplary embodiment of the present invention uses a time-division driving method. In this case, the barrier layer 150 is driven in the time-division driving method, and the controller 400 generates and transmits the barrier driver control signal CONT3 for controlling the barrier layer 150 to the barrier driver 500.

In the time-division driving method, a light blocking part and a light transmitting part are alternately formed. Differing from the time-division driving method, in a spatial division method, a view point pixel (e.g., a predetermined view point pixel) is positioned at a space or location (e.g., a predetermined space), and a view point image is displayed in the pixel. When the stereoscopic image is displayed in the spatial division method by using the binocular parallax, the left-eye and right-eye pixels are spatially divided to be alternately arranged. In this case, the images displayed on the left-eye and right-eye pixels have a resolution that is reduced by half of that of the plane image. Accordingly, the electronic image device according to the exemplary embodiment of the present invention is driven in the time-division driving method.

Figure 3:
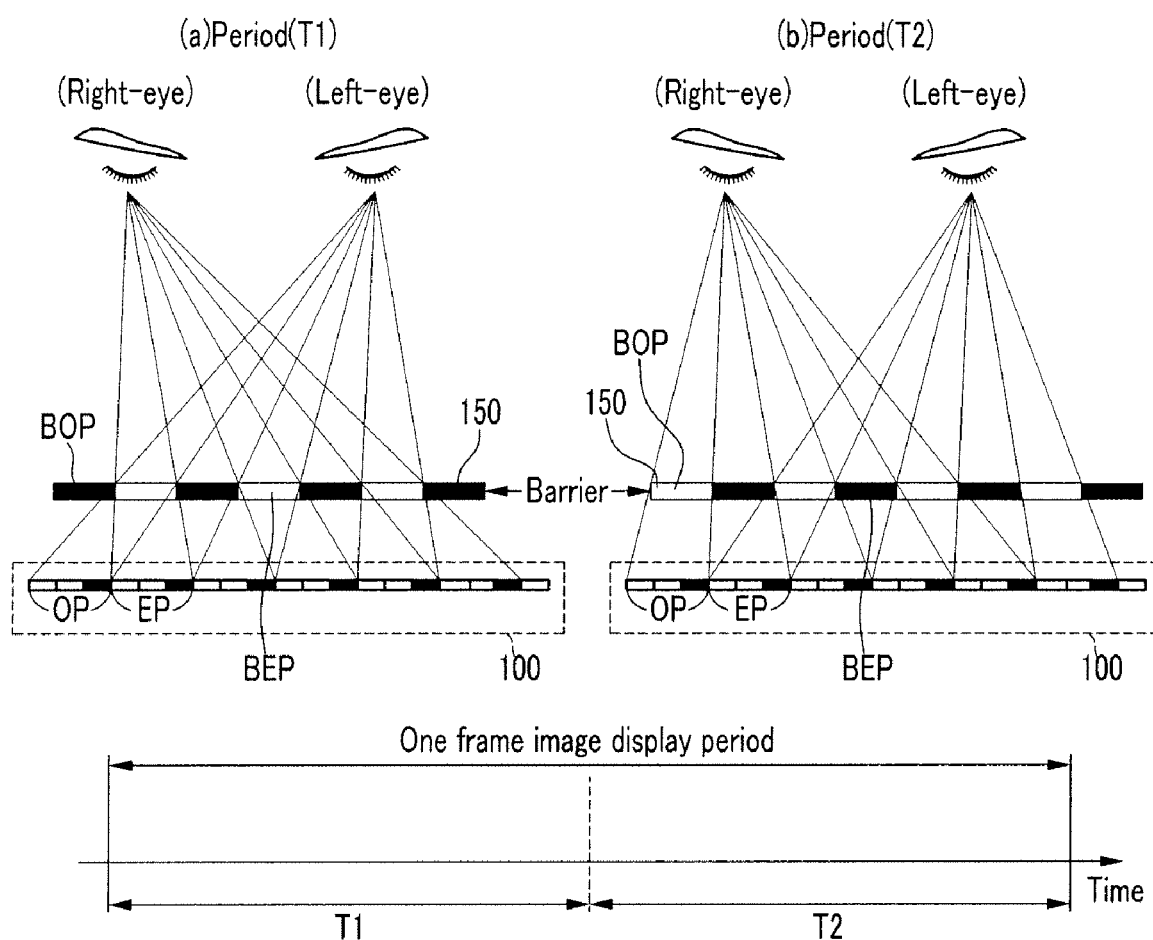
FIG. 3 is a diagram representing a time-division driving method of a plane/stereoscopic image display device according to an exemplary embodiment of the present invention.

The time-division driving method according to the exemplary embodiment of the present invention will now be described with reference to FIG. 3. FIG. 3 is a diagram representing the time-division driving method of a plane/stereoscopic image display device according to the exemplary embodiment of the present invention.

The time division driving method may include: 1) a method in which a light source is alternately operated at left and right sides, and the left and right sides are divided according to a time division method by using an optical element including a combination of a prism and a lenticular lens; or 2) a method in which a slit in a liquid crystal barrier through which light passes is divided into several sections and the divided slit sections are moved or controlled in synchronization with a displayed image. The electronic imaging device according to the exemplary embodiment of the present invention is driven according to method 2. However, the present invention is not limited thereto, and when method 1 is used, an optical element including a combination of a light source, the prism, and the lenticular lens, instead of the liquid crystal barrier, can be used. FIG. 3 shows the basic case of two eyes representing two viewing angles, but the present invention is not limited thereto, and the same principle can be applied for the case of multiple eyes representing multiple viewing angles.

FIGS. 3(*a*) and 3(*b*) illustrate how an image is displayed to a viewer by using the time-division method. Each frame of an image is divided into a first period T1 and a second period T2. FIG. 3(*a*) shows that an image obtained by combining the left and right sides at the first period T1 is seen by a viewer. FIG. 3*b* shows that an image obtained by combining right and left sides at the second period T2 is displayed to the viewer.

In FIG. 3(*a*), an odd pixel OP of the display unit 100 is a left-eye pixel and an even pixel EP is a right-eye pixel. An odd pixel BOP of the barrier layer 150 is a non-transmission region and an even pixel BEP of the barrier layer 150 is a transmission region. As shown in FIG. 3*a*, the barrier layer 150 is configured to allow the odd pixel OP to project a left-eye image to the left eye and the even pixel EP to project a right-eye image to the right eye. The left-eye image projected from the odd pixel OP is formed as an image having a certain disparity with respect to the right-eye image, and the right-eye image projected from the even pixel EP is formed as an image having a certain disparity with respect to the left-eye image. Accordingly, when the viewer recognizes the left-eye image projected from the odd pixel OP and the right-eye image projected from the even pixel EP with the viewer's left and right eyes respectively, the viewer obtains depth information as if the viewer looked at an actual solid target, perceiving a stereoscopic effect.

In FIG. 3(*b*), during period T2, an odd pixel OP of the display unit 100 is the right-eye pixel and an even pixel EP of the display unit 100 is the left-eye pixel. An odd pixel BOP of the barrier layer 150 is a transmission region and an even pixel BEP of the barrier layer 150 is a non-transmission region. As shown in FIG. 3*b*, the barrier layer 150 is configured to allow the even pixel EP to project a left-eye image to the left eye and the odd pixel OP to project a right-eye image to the right eye. The right-eye image projected from the odd pixel OP can be formed as an image having a certain disparity with respect to the left-eye image, and the left-eye image projected from the even pixel EP can be formed as an image having a certain disparity with respect to the right-eye image. Accordingly, when the viewer recognizes the right-eye image projected from the odd pixel OP and the left-eye image projected from the even pixel EP with the viewer's left and right eyes respectively, the viewer obtains depth information as if the viewer looked at an actual solid target, thereby perceiving a stereoscopic effect.

In this manner, during the period T1, the odd pixel is seen by a viewer's left eye while the even pixel is seen by a viewer's right eye, and during the period T2, the odd pixel is seen by a viewer's right eye while the even pixel is seen by a viewer's left eye. Accordingly, the viewer can watch the stereoscopic image with the same resolution as that of a plane image.

Referring back to FIG. 1, the barrier driver 500 generates a barrier driving signal CB for driving the barrier layer 150 according to the barrier driver control signal CONT3. Detailed description of the barrier driver 500 and the barrier layer 150 will be described later in the specification. The barrier driving signal CB according to the first exemplary embodiment of the present invention may be determined by the number of barriers forming the barrier layer 150. That is, when the barrier layer 150 is divided into a plurality of barriers, the barrier driving signals CB are generated according to the number of barriers to drive the respective barriers.

To display the stereoscopic image, the controller 400 generates the image data corresponding to a left-to-right image obtained by combining the images from the left-eye image to the right-eye image during the first period T1 (as shown in FIG. 3(*a*)) and transmits the image data to the data driver 300. During the second period T2 (as shown in FIG. 3(*b*)), the controller 400 generates the image data corresponding to a right-to-left image obtained by combining the images from the right eye image to the left-eye image and transmits the image data to the data driver 300. In this case, a frame frequency is twice higher than the frame frequency used in the conventional display device, so as to display the left-to-right image and the right-to-left image on the display unit during one frame at the same frequency as the conventional display device. The barrier layer 150 is driven while being synchronized with the frame frequency. The controller 400 controls the drivers to repeatedly display the same plane image without changing the frame frequency while the plane image is displayed, which will be described later with reference to FIG. 5 to FIG. 7.

Firstly, the barrier driver 500 and the barrier layer 150 according to the first exemplary embodiment of the present invention will be described with reference to FIG. 4.

Figure 4:
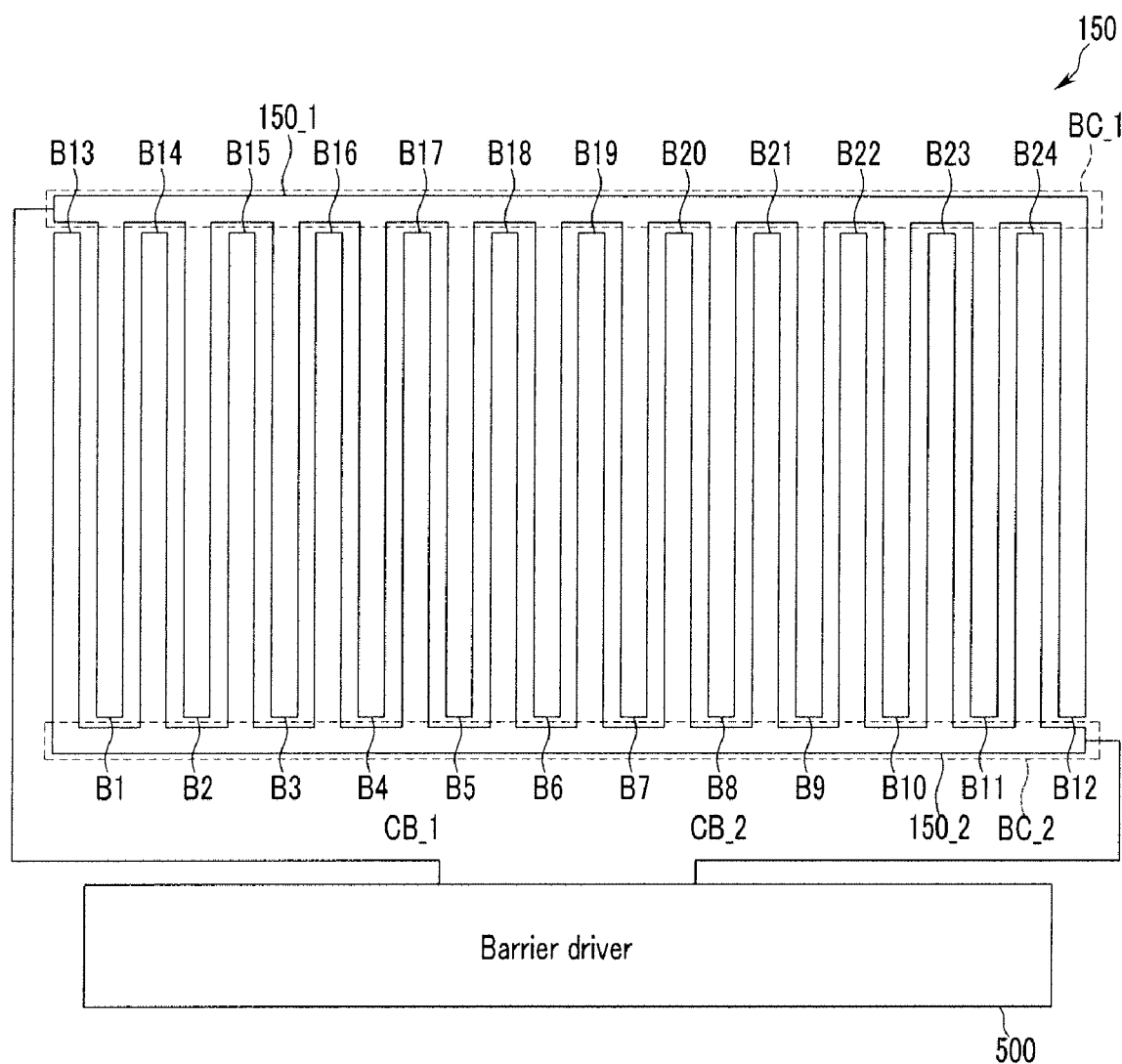
FIG. 4 shows a schematic diagram of a barrier driver and a barrier layer according to the first exemplary embodiment of the present invention.

FIG. 4 shows a schematic diagram of the barrier driver 500 and the barrier layer 150 according to the first exemplary embodiment of the present invention.

As shown in FIG. 4, the barrier layer 150 includes a first barrier 150_1 and a second barrier 150_2. The first barrier 150_1 includes a plurality of barrier electrodes B1 to B12 formed in a stripe pattern and a connection electrode BC_1 formed (e.g. extending) in a direction crossing the plurality of barrier electrodes B1 to B12, and is connected to each of the plurality of barrier electrodes B1 to B12. The barrier BEP shown in FIG. 3 is a cross-sectional view of the first barrier 150-1. In addition, the second barrier 150_2 includes a plurality of barrier electrodes B13 to B24 formed in a stripe pattern and a connection electrode BC_2 formed (e.g. extending) in a direction crossing the plurality of barrier electrode B13 to B24, and is connected to each of the plurality of barrier electrodes B13 to B24. The barrier BOP shown in FIG. 3 is a cross-sectional view of the second barrier 150-2. The barrier layer 150 according to the first exemplary embodiment of the present invention includes the first barrier 150_1 and the second barrier 150_2, and the barrier driver 500 generates two barrier driving signals CB_1 and CB_2 to drive the respective barriers. The barrier driver 500 may establish driving voltages of the barrier driving signals CB_1 and CB_2 according to characteristics of the first and second barriers 150_1 and 150_2. In general, when the driving voltage is not applied, the barrier is divided into a normally black barrier that is a non-transmission area and a normally white barrier that is a transmission area. When the first and second barriers 150_1 and 150_2 according to the first exemplary embodiment of the present invention are the normally black barriers, the barrier driving signals CB_1 and CB_2 apply driving voltages (e.g., having a predetermined level) to realize the first and second barriers 150_1 and 150_2 to be the transmission areas. In addition, when the first and second barriers 150_1 and 150_2 are the normally white barriers, the barrier driving signals CB_1 and CB_2 apply driving voltages (e.g., having a predetermined level) to realize the first and second barriers 150_1 and 150_2 to be the non-transmission areas. It will be assumed that the first and second barriers 150_1 and 150_2 forming the barrier layer are the normally white barriers, but it is not limited thereto.

An operation of the electronic image device according to the first exemplary embodiment of the present invention will now be described. Firstly, a method for generating the left-to-right image and the right-to-left image by combining the left-eye image and the right-eye image will be described with reference to FIG. 5A, FIG. 5B, and FIG. 5C.

Figure 5A:
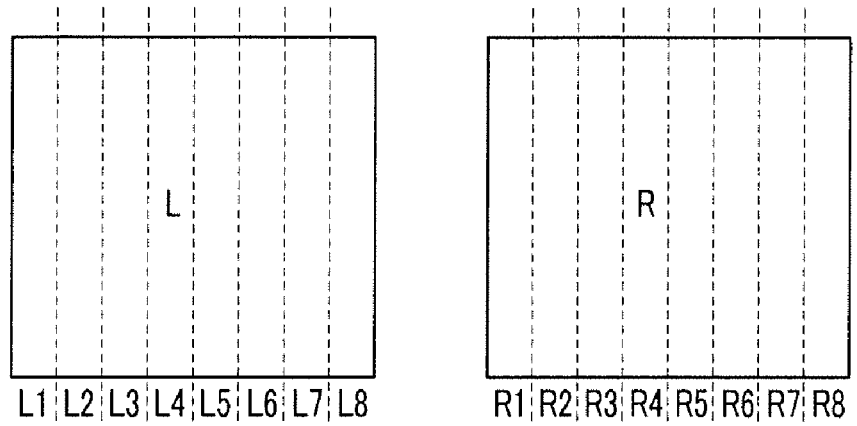
FIG. 5A is a diagram of screens in which left-eye image data and right-eye-image data of one frame unit in the input signal IS according to the first exemplary embodiment of the present invention are displayed without being combined.

FIG. 5A is a diagram of screens in which the left-eye image data and the right-eye image data of one frame unit in the input signal IS according to the first exemplary embodiment of the present invention are displayed without being combined. The respective screens L and R are respectively divided into 8 sections, but it is not limited thereto, and the screens may be divided into the number of data lines.

Figure 5B:
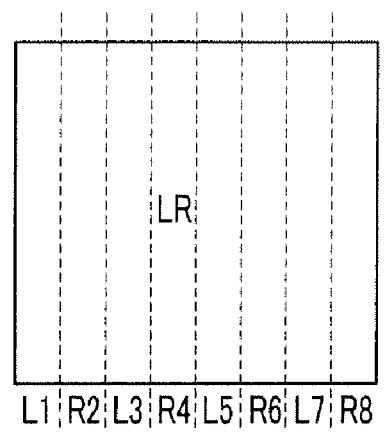
FIG. 5B is a diagram representing a left-to-right image LR generated by combining a left-eye image and a right-eye image by a controller according to the first exemplary embodiment of the present invention.
Figure 5C:
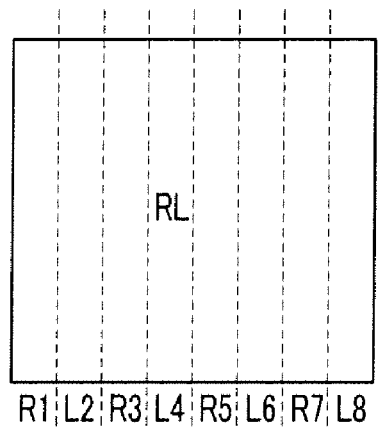
FIG. 5C is a diagram representing a right-to-left image RL generated by combining the right-eye image and the left-eye image by the controller according to the first exemplary embodiment of the present invention.

The controller 400 as shown in FIG. 1 divides the respective screens L and R as shown in FIG. 5A and combines the respective sections in FIGS. 5B and 5C.

FIG. 5B is a diagram representing the left-to-right image LR generated by combining the left-eye image and the right-eye image by the controller 400 according to the first exemplary embodiment of the present invention.

FIG. 5C is a diagram representing the right-to-left image RL generated by combining the right-eye image and the left-eye image by the controller 400 according to the first exemplary embodiment of the present invention.

As described, when the input signal IS is the stereoscopic image data, the controller 400 generates the left-to-right image data and the right-to-left image data, and transmit them to the data driver 300 as shown in FIG. 1.

Figure 6:
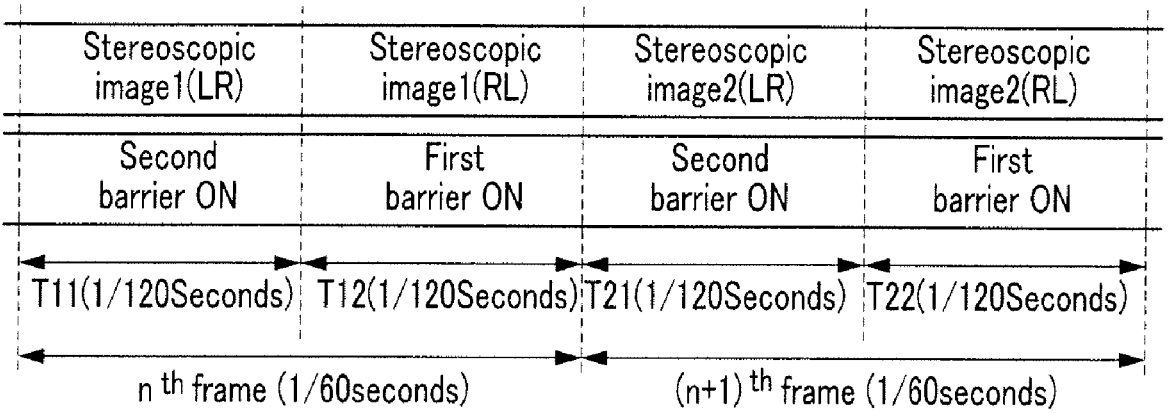
FIG. 6 is a diagram representing a displayed image and an operation of the barrier layer when a stereoscopic image is displayed by the electronic image device according to the first exemplary embodiment of the present invention.

FIG. 6 is a diagram representing a displayed image and an operation of the barrier layer 150 when the stereoscopic image is displayed by the electronic image device according to the first exemplary embodiment of the present invention.

As shown in FIG. 6, an $n^{th}$ frame is displayed during 1/60 of a second. At this time, the left-to-right image LR of a stereoscopic image 1 is displayed during a period T11, and the right-to-left image RL of the stereoscopic image 1 is displayed during a period T12. In addition, when a subsequent $(n+1)^{th}$ frame is displayed during 1/60 of a second, the left-to-right image LR of a stereoscopic image 2 is displayed during a period T21, and the right-to-left image RL of the stereoscopic image 2 is displayed during a period T22.

Thereby, an image corresponding to an odd pixel and an image corresponding to an even pixel are respectively transmitted to the left eye and the right eye through the barrier during the period T11, and the image corresponding to the odd pixel and the image corresponding to the even pixel are respectively transmitted to the right eye and the left eye through the barrier during the subsequent period T12. That is, original plane images of an odd pixel array and an even pixel array are respectively transmitted to the left and right eyes during the period T11, and the images of the even pixel array and the odd pixel array are respectively transmitted to the left and right eyes during the period T12. Accordingly, a viewer may see the original plane image without reducing the resolution during one frame period. The image of the subsequent $(n+1)^{th}$ frame is transmitted to the left and right eyes.

Figure 7:
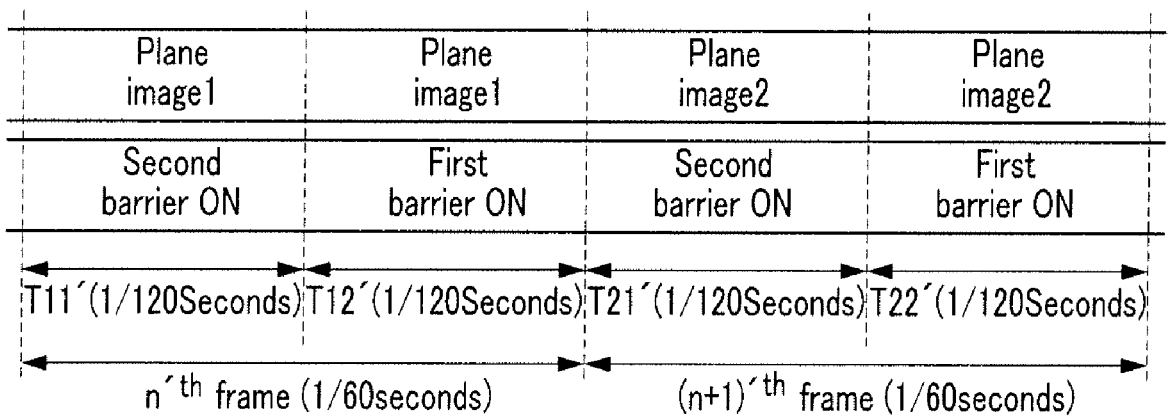
FIG. 7 is a diagram representing a displayed image and an operation of the barrier layer when a plane image is displayed by the electronic image device according to the first exemplary embodiment of the present invention.

FIG. 7 is a diagram representing the displayed image and an operation of the barrier layer 150 when the plane image is displayed by the electronic image device according to the first exemplary embodiment of the present invention.

As shown in FIG. 7, when an $n'^{th}$ frame is displayed during 1/60 of a second, a plane image 1 is displayed during a period T11', and the plane image 1 is repeatedly displayed during a period T12'. In addition, when a subsequent $(n+1)'^{th}$ frame is displayed during 1/60 of a second, a plane image 2 is displayed during a period T21', and the plane image 2 is repeatedly displayed during a period T22'.

Thereby, the plane images 1 of the odd and even pixel arrays are respectively transmitted to the left and right eyes during the period T11'. In addition, the plane images 1 of the even and odd pixel arrays are respectively transmitted to the left and right eyes during the period T12'. Accordingly, while one frame is displayed during 1/60 of a second, the plane image 1 is transmitted to the left and right eyes without reducing the resolution. The plane image 2 of the subsequent $(n+1)'^{th}$ frame is also transmitted to the eyes.

A case in which the plane image and the stereoscopic image are simultaneously or concurrently displayed during one frame by the electronic image device according to the first exemplary embodiment of the present invention will now be described.

Figure 8:
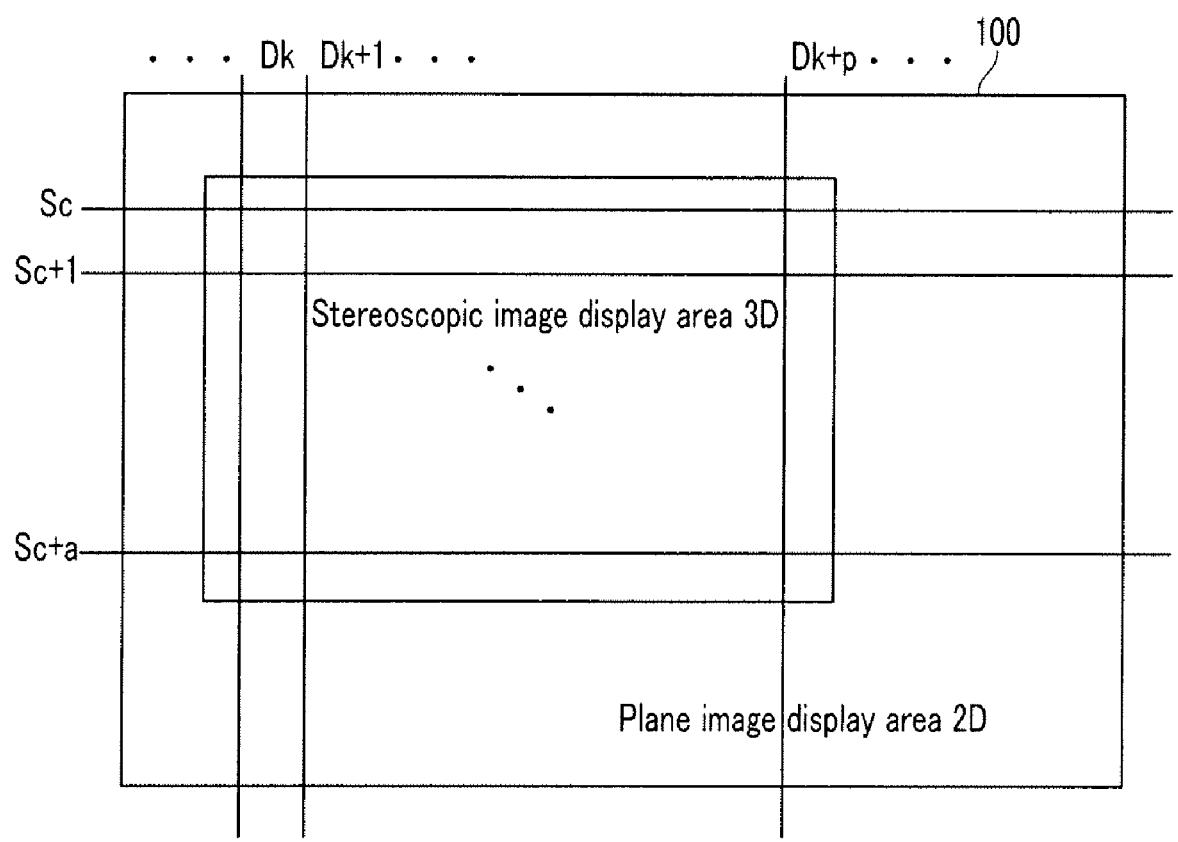
FIG. 8 is a diagram representing a case in which the plane image and the stereoscopic image are simultaneously or concurrently displayed by the electronic image device according to the first exemplary embodiment of the present invention.

FIG. 8 is a diagram representing the case in which the plane image and the stereoscopic image are simultaneously or concurrently displayed in the electronic image device according to the first exemplary embodiment of the present invention.

As shown in FIG. 8, a stereoscopic image display area 3D and a plane image display area 2D are simultaneously or concurrently provided on the display unit 100, and a plurality of scan lines Sc to Sc+a and a plurality of data lines Dk to Dk+p corresponding to the stereoscopic image display area 3D are illustrated.

The controller 400 (shown in FIG. 1) classifies the input signal IS as signals transmitted to the respective data lines. In addition, the controller 400 classifies the plane image data and the stereoscopic image data from the input signals IS. In further detail, the controller 400 detects the image data corresponding to one scan line of the display unit 100 among the input signals IS, and the detected image data are divided into data for each data line. Hereinafter, the image data corresponding to one data line among the plurality of data lines will be referred to as pixel data. The pixel data includes a header unit, and each header unit includes an identifier for indicating the data type (i.e., the plane image data or the stereoscopic image data). The controller 400 identifies the plane image data or the stereoscopic image data through the header unit of each pixel data, and it may identify where the pixel data is displayed on the display unit 100. In further detail, the controller 400 establishes addresses according to a plurality of pixels forming the display unit 100, and detects the address corresponding to the detected plane image data or stereoscopic image data. The controller 400 stores the plane image data and the stereoscopic image data identified according to the detected address in a frame buffer memory (not shown). The frame buffer memory includes storage spaces allocated according to the plurality of pixel addresses of the display unit 100. In this case, the controller 400 combines the data for the left-eye image and the data for the right-eye image that are included in the stereoscopic image data to generate the left-to-right image data and the right-to-left image data, and stores the image data in the frame buffer memory. That is, a left-to-right image memory and a right-to-left image memory are separately provided for one pixel, and the controller 400 separately stores the left-to-right image data and the right-to-left image data in the respective left-to-right and right-to-left image memories. The controller 400 transmits the data stored in the frame buffer memory to the data driver 300 (shown in FIG. 1).

Operations of the data driver 300 and the scan driver 200 are substantially the same as described with reference to FIG. 1.

The barrier driver 500 is driven in the time-division driving method regardless of the plane image display area 2D or the stereoscopic image display area 3D.

An operation of the electronic image device for displaying the plane image and the stereoscopic image will be described with reference to FIG. 9 and FIG. 10.

Figure 9:
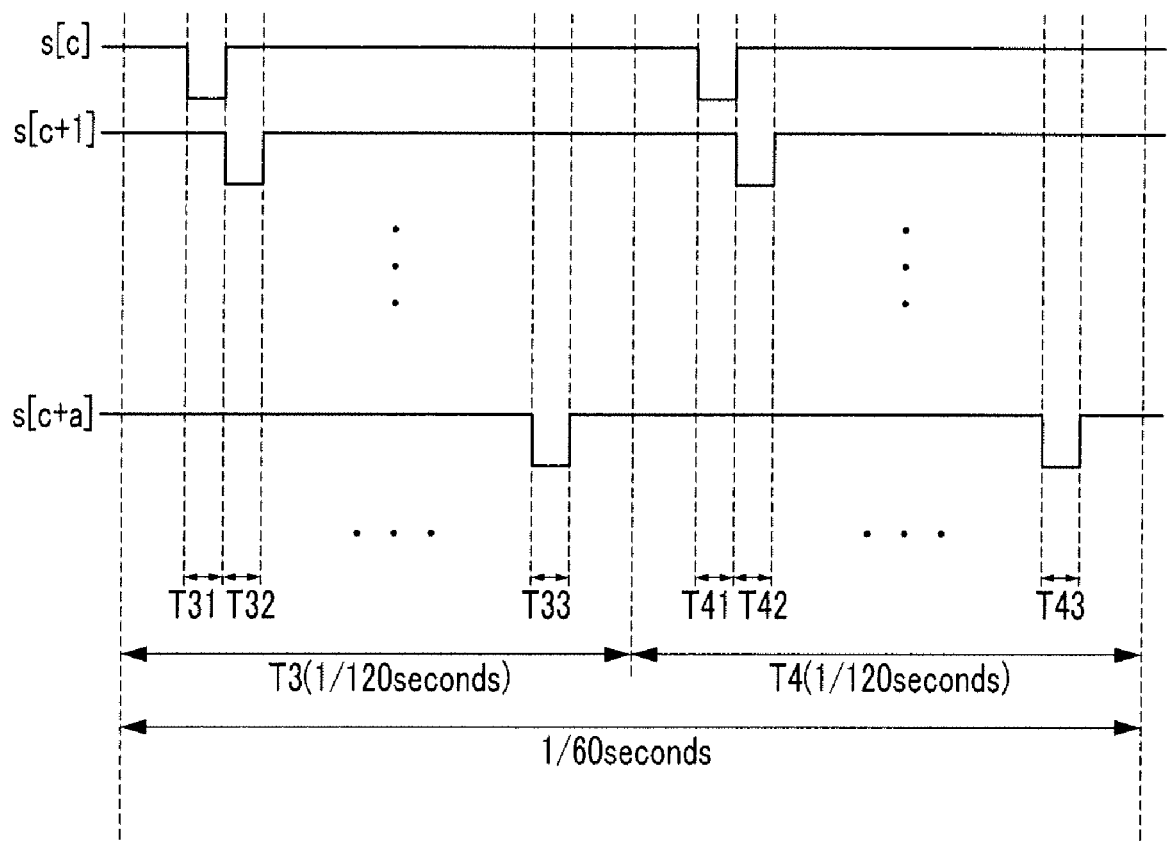
FIG. 9 is a diagram representing selection signals transmitted to a stereoscopic image display area among the plurality of selection signals according to the first exemplary embodiment of the present invention.

FIG. 9 is a diagram representing selection signals transmitted to the stereoscopic image display area among the plurality of selection signals according to the first exemplary embodiment of the present invention. The plurality of selection signals are sequentially transmitted to the scan lines Sc to Sc+a. The selection signal according to the first exemplary embodiment of the present invention has a voltage that is low enough to turn on the switching transistor M2 of the pixel 105 (shown in FIG. 2). Referring to FIGS. 8 and 9, the plurality of selection signals are sequentially transmitted to the plurality of scan lines $S_1$ to $S_n$ during a period T3 in the time-division driving method. In addition, the respective selection signals are sequentially transmitted to the plurality of scan lines $S_1$ to $S_n$ during a period T4. In the period T3, during a period T31 for transmitting the selection signal s[c] to the scan line Sc, a plurality of data signals are transmitted to the respective data lines $D_1$ to $D_m$. The selection signal s[c+1] is transmitted to the scan line Sc+1 during a subsequent period T32, and the plurality of data signals are transmitted to the respective data lines $D_1$ to $D_m$ during the period T3. In the above manner, the respective data signals are transmitted to the plurality of data lines $D_1$ to $D_m$ while the respective selection signals are transmitted to the scan lines. An operation of a period T4 is the same as above.

The plurality of data signals will be described with reference to FIG. 10A and FIG. 10B.

Figure 10A:
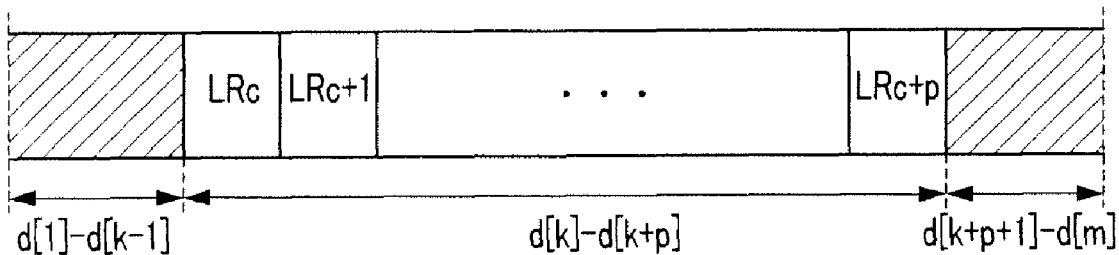
FIG. 10A is a diagram representing one data signal transmitted during the period T3 as shown in FIG. 9 among the plurality of data signals of the electronic image device according to the first exemplary embodiment of the present invention.

FIG. 10A is a diagram representing one data signal transmitted during the period T3 (shown in FIG. 9) among the plurality of data signals of the electronic image device according to the first exemplary embodiment of the present invention. In further detail, in reference to FIG. 10A, the plurality of data signals d[1] to d[m] are transmitted to the plurality of data lines $D_1$ to $D_m$ while the selection signal is transmitted to one of the scan lines Sc to Sc+a formed in the stereoscopic image display area 3D and the plane image display area 2D during the period T3.

As shown in FIG. 10A, the plurality of data signals d[1] to d[k−1] and d[k+p+1] to d[m] transmitted to the plurality of data lines D1 to Dk−1 and Dk+p+1 to Dm passing through the plane image display area 2D are the plane image data that are illustrated with oblique lines. In this case, the respective data signals d[k] to d[k+p] transmitted to the plurality of data lines Dk to Dk+p passing through the stereoscopic image display area 3D respectively have voltage or current values to display the left-to-right images LRc to LRc+p.

Figure 10B:
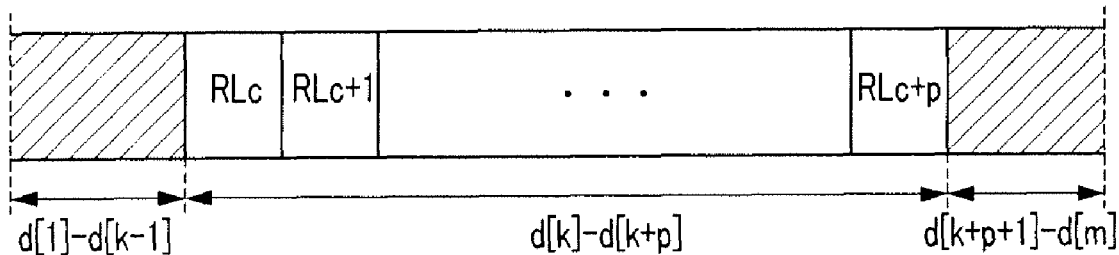
FIG. 10B is a diagram representing one data signal transmitted during a period T4 as shown in FIG. 9 among the plurality of data signals of the electronic image device according to the first exemplary embodiment of the present invention.

FIG. 10B is a diagram representing one data signal transmitted during the period T4 (shown in FIG. 9) among the plurality of data signals of the electronic image device according to the first exemplary embodiment of the present invention. In further detail, in FIG. 10B, the plurality of data signals d[1] to d[m] are transmitted to the data lines $D_1$ to $D_m$ while the selection signal is transmitted to one of the scan lines Sc to Sc+a formed in the stereoscopic image display area 3D and the plane image display area 2D during the period T4.

As shown in FIG. 10B, the plurality of data signals d[1] to d[k−1] and d[k+p+1] to d[m] transmitted to the plurality of data lines D1 to Dk−1 and Dk+p+1 to Dm passing through the plane image display area 2D are the plane image data that are illustrated with oblique lines. In this case, the respective data signals d[k] to d[k+p] transmitted to the plurality of data lines Dk to Dk+p passing through the stereoscopic image display area 3D respectively have voltage and current values to display the right-to-left images RLc to RLc+p.

Figure 11:
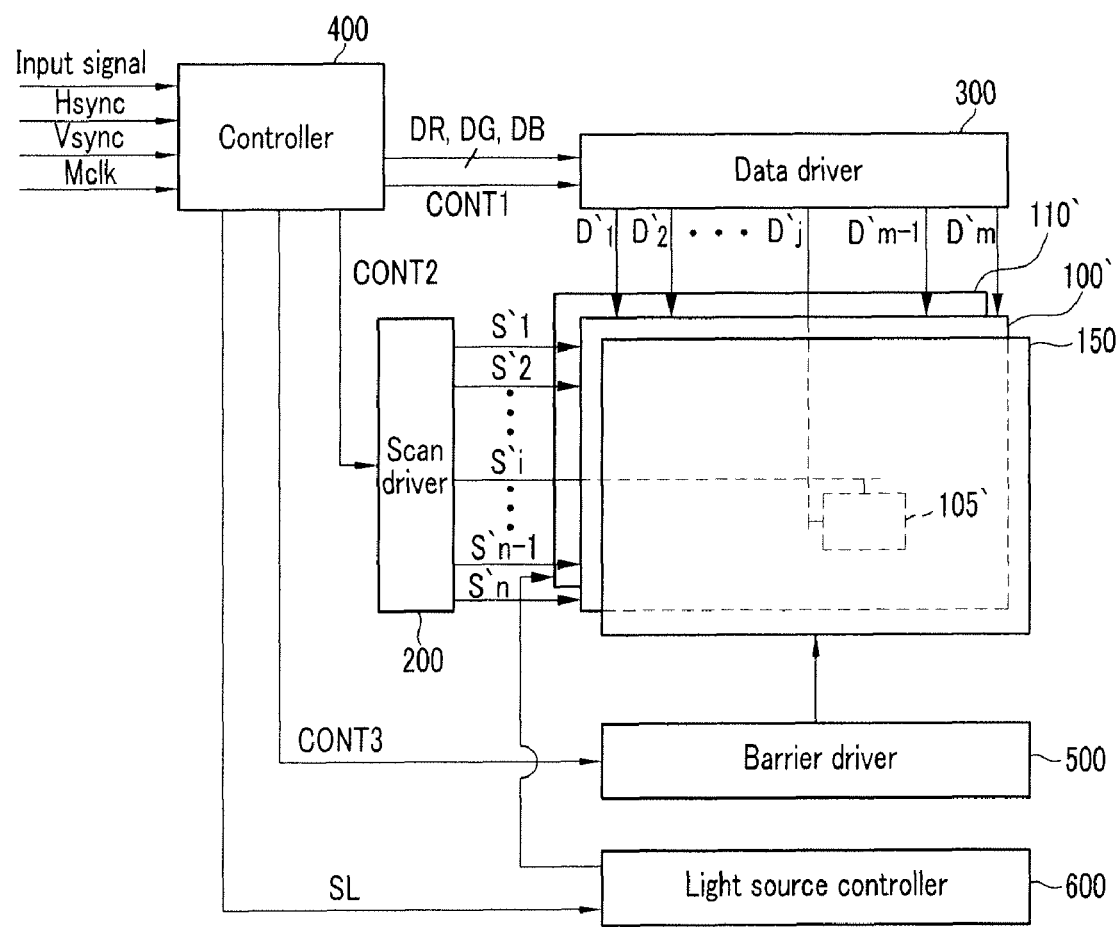
FIG. 11 is a schematic diagram representing an electronic image device according to a second exemplary embodiment of the present invention.

FIG. 11 is a diagram representing the electronic image device according to a second exemplary embodiment of the present invention.

As shown in FIG. 11, the electronic image device according to the second exemplary embodiment of the present invention includes a display unit 100' for displaying an image by using a liquid crystal layer, a light source 110', and a light source controller 600. The display unit 100' includes a plurality of pixel circuits 105' for displaying the image by using the liquid crystal layer. The electronic image device according to the second exemplary embodiment of the present invention is substantially the same as that of the first exemplary embodiment of the present invention except for the liquid crystal layer.

Figure 12:
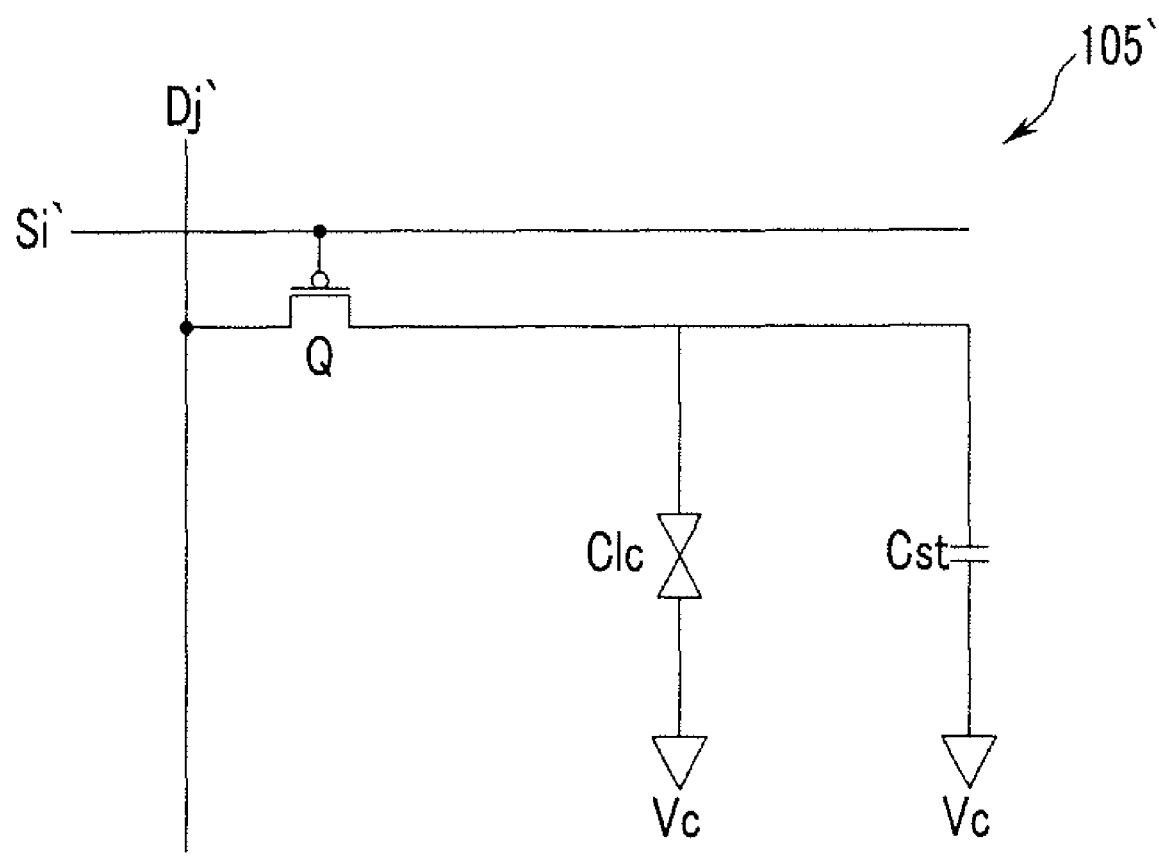
FIG. 12 is a schematic diagram representing a pixel circuit according to the second exemplary embodiment of the present invention.

FIG. 12 is a schematic diagram representing the pixel circuit 105' according to the second exemplary embodiment of the present invention.

As shown in FIG. 12, the pixel circuit 105' includes a switch Q, a liquid crystal layer Clc, and a sustain capacitor Cst. The switch Q is turned on in response to the selection signal transmitted through a scan line Si'. The switch Q according to the second exemplary embodiment of the present invention can be a p-channel transistor. When the switch Q is turned on in response to the selection signal of a low level, the data signal of a data line Dj' is transmitted through the turned on switch Q, the liquid crystal layer is driven according to a voltage difference between a voltage of the data signal and a common voltage Vc, and therefore a light transmitted from a light source 110' is refracted. In this case, the sustain capacitor Cst maintains a voltage difference between both terminals of the liquid crystal layer Clc.

Referring back to FIG. 11, the light source 110' includes red R, green G, and blue B light emitting diodes (not shown), and lights corresponding to red R, green G, and blue B are output to the display unit 100'. In further detail, the red R, green G, and blue B light emitting diodes of the light source 110' output lights to an R subpixel, a G subpixel, and a B subpixel of the display unit 100'.

The light source controller 600 controls a turning on/off time of the light emitting diode of the light source 110' in response to a control signal SL output from the controller 400. In this case, a period for supplying an analog data voltage from the data driver 300' to the data line and a period for turning on the red R, green G, and blue B light emitting diodes by the light source controller 600 may be synchronized by the control signal SL provided by the controller 400.

According to the exemplary embodiment of the present invention, the plane image and the stereoscopic image may be simultaneously or concurrently displayed in the time-division driving method. In addition, according to the exemplary embodiment of the present invention, an image selected from the plane image and the stereoscopic image by a viewer may be displayed by the electronic image device having a simplified configuration.

While this invention has been described in connection with what is presently considered to be practical exemplary embodiments, it is to be understood that the invention is not limited to the disclosed embodiments, on the contrary, it is intended to cover various modifications and equivalent arrangements included within the spirit and scope of the appended claims.

According to the exemplary embodiment of the present invention, an electronic image device for simultaneously or concurrently displaying the plane image and the stereoscopic image in the time-division driving method and a driving method thereof are provided.
In addition, a simplified electronic image device for displaying a desired image among the plane image and the stereoscopic image and a driving method thereof are provided.

What is claimed is:

1. An electronic image device comprising:
a display unit for displaying an image in at least one frame period, the frame period comprising a first period and a second period, wherein the image comprises at least one of a plane image or a stereoscopic image, the stereoscopic image comprising a first image displayed during the first period and a second image displayed during the second period; and
a barrier layer comprising a first barrier driven during the first period and a second barrier driven during the second period,
wherein the plane image is displayed through the barrier layer during the first and second periods in an area of the display unit for displaying the plane image, and the first image displayed through the barrier layer during the first period and the second image displayed through the barrier layer during the second period are respectively images combined in different sequences in an area of the display unit for displaying the stereoscopic image,
wherein the barrier layer has a same first barrier pattern during the first period for both the plane image and the first image of the stereoscopic image, and
wherein the barrier layer has a same second barrier pattern during the second period for both the plane image and the second image of the stereoscopic image.

2. The electronic image device of claim 1, wherein the first image comprises a first view image and a second view image in a first combination, and the second image comprises the first view image and the second view image in a second combination.

3. The electronic image device of claim 2, wherein the first barrier comprises a plurality of first barrier electrodes in a stripe pattern and a first connection electrode coupled to each of the plurality of first barrier electrodes and extending in a direction crossing the plurality of first barrier electrodes, and the second barrier comprises a plurality of second barrier electrodes in a stripe pattern that alternates with the plurality of first barrier electrodes and a second connection electrode coupled to each of the plurality of second barrier electrodes and extending in a direction crossing the plurality of second barrier electrodes.

4. The electronic image device of claim 3, wherein the first and second barriers are transmission areas while not being driven, and the first and second barriers are non-transmission areas while being driven.

5. The electronic image device of claim 3, wherein the first and second barriers are non-transmission areas while not being driven, and the first and second barriers are transmission areas while being driven.

6. An electronic image device comprising:
a display unit comprising a plurality of scan lines for transmitting a plurality of selection signals, a plurality of data lines for transmitting a plurality of data signals, and a plurality of pixels coupled to the scan lines and the data lines;
a data driver for converting input data into the plurality of data signals and transmitting the plurality of data signals to the plurality of data lines in synchronization with the selection signals;
a controller for reading an input signal, wherein when the input signal comprises stereoscopic image data having at least one stereoscopic image, each stereoscopic image frame is displayed in at least two periods comprising a first period and a second period, transmitting a first period stereoscopic image data corresponding to the stereoscopic image frame to the data driver so that a first period stereoscopic image is displayed during the first period, and transmitting a second period stereoscopic image data corresponding to the stereoscopic image frame to the data driver so that a second period stereoscopic image is displayed during the second period, and wherein when the input signal comprises plane image data, transmitting the plane image data to the data driver to display a plane image during the first period, and transmitting the plane image data to the data driver to display the same plane image during the second period; and
a barrier layer comprising a first barrier driven during the first period and a second barrier driven during the second period,
wherein the barrier layer has a same first barrier pattern during the first period for both the plane image and the first period stereoscopic image, and
wherein the barrier layer has a same second barrier pattern during the second period for both the plane image and the second period stereoscopic image.

7. The electronic image device of claim 6, wherein the first period stereoscopic image is formed by combining a first view image and a second view image in a first combination, and the second period stereoscopic image is formed by combining the second view image and the first view image in a second combination.

8. The electronic image device of claim 7, wherein the controller comprises a frame buffer memory for storing the plane image data, the first period stereoscopic image data, and the second period stereoscopic image data.

9. The electronic image device of claim 8, wherein the first barrier comprises a plurality of first barrier electrodes in a stripe pattern and a first connection electrode coupled to each of the plurality of first barrier electrodes and extending in a direction crossing the plurality of first barrier electrodes, and the second barrier comprises a plurality of second barrier electrodes in a stripe pattern that alternates the plurality of first barrier electrodes and a second connection electrode connected to each of the plurality of second barrier electrodes and extending in a direction crossing the plurality of second barrier electrodes.

10. The electronic image device of claim 9, wherein the first and second barriers are transmission areas while not being driven, and the first and second barriers are non-transmission areas while being driven.

11. The electronic image device of claim 9, wherein the first and second barriers are non-transmission areas while not being driven, and the first and second barriers are transmission areas while being driven.

12. A driving method of an electronic image device comprising a display unit for displaying an image and a barrier layer on the display unit, the method comprising:

dividing data included in an input signal into plane image data and stereoscopic image data;

dividing a frame period for displaying the image of one frame into at least two periods comprising a first period and a second period;

displaying a first stereoscopic image generated by using the stereoscopic image data on the display unit during the first period, and displaying a second stereoscopic image that is different from the first stereoscopic image generated from the stereoscopic image data on the display unit during the second period;

displaying through the barrier layer a plane image generated by using the plane image data during the first and second periods; and in the barrier layer, generating a non-transmission area and a transmission area in an alternating pattern in the first period, and alternating the non-transmission area and the transmission area in the second period.

13. The driving method of claim 12, wherein the first stereoscopic image is formed by combining images from a first view image and a second view image in a first combination, and the second stereoscopic image is formed by combining the images from the second view image to the first view image in a second combination.

14. The driving method of claim 13, wherein the displaying of the first stereoscopic image and the second stereoscopic image on the display unit comprises:

combining data for the first view image and data for the second view image that are included in the stereoscopic image data in a first combination to generate a first stereoscopic image data; and combining the data for the first view image and the data for the second view image that are included in the stereoscopic image data in a second combination to generate a second stereoscopic image data.

15. The driving method of claim 14, further comprising:

storing the first stereoscopic image data according to an address of a first pixel corresponding to the first stereoscopic image data among a plurality of pixels of the display unit; and storing the second stereoscopic image data according to the address of the first pixel.

* * * * *